(12) United States Patent
Clayton et al.

(10) Patent No.: US 6,623,540 B2
(45) Date of Patent: Sep. 23, 2003

(54) FILTER APPARATUS FOR HVAC SYSTEM (76) Inventors: Robert L. Clayton, 640 Daniel Ct., Apt. 2 I, Cincinnati, OH (US) 45244; Michael T. Hodge, 10156 Kenwood Rd., Cincinnati, OH (US) 45242

( * ) Notice: Subject to any disclaimer, the term of this patent is extended or adjusted under 35 U.S.C. 154(b) by 26 days.

(21) Appl. No.: 09/892,019

(22) Filed: Jun. 26, 2001

(65) Prior Publication Data

US 2002/0194824 A1 Dec. 26, 2002

(51) Int. Cl.[7] .............................................. B01D 25/00
(52) U.S. Cl. ............................. 55/480; 55/481; 55/492; 55/493; 55/508; 55/511; 55/DIG. 31; 55/DIG. 35
(58) Field of Search ......................... 55/480, 481, 492, 55/493, 508, 511, DIG. 31, DIG. 35, DIG. 37, 385.2

(56) References Cited

U.S. PATENT DOCUMENTS

| | | |
|---|---|---|
| 1,429,811 A | 9/1922 | Tynan |
| 1,694,089 A | 12/1928 | Wright |
| 1,886,460 A | 11/1932 | Anderson |
| 3,793,692 A * | 2/1974 | Tate et al. ............. 55/DIG. 31 |
| 5,176,570 A * | 1/1993 | Liedl ..................... 55/DIG. 31 |
| 5,240,487 A | 8/1993 | Kung |
| 5,399,180 A * | 3/1995 | Kopp ..................... 55/DIG. 31 |
| 5,462,569 A * | 10/1995 | Benjamin .............. 55/DIG. 31 |
| 5,525,136 A * | 6/1996 | Rosen ................... 55/DIG. 31 |
| 5,525,145 A | 6/1996 | Hodge |
| 5,690,719 A | 11/1997 | Hodge |
| 5,776,218 A * | 7/1998 | Enns ..................... 55/DIG. 31 |
| 5,782,944 A * | 7/1998 | Justice .................. 55/DIG. 31 |
| 5,863,310 A * | 1/1999 | Brown et al. .......... 55/DIG. 31 |
| 5,944,860 A | 8/1999 | Mack et al. |
| 5,989,303 A | 11/1999 | Hodge |
| 6,030,427 A * | 2/2000 | Sorile et al. ........... 55/DIG. 31 |
| 6,033,453 A * | 3/2000 | Weddell, III .......... 55/DIG. 31 |
| 6,241,794 B1 * | 6/2001 | Jadran et al. .......... 55/DIG. 31 |

* cited by examiner

Primary Examiner—David A. Simmons
Assistant Examiner—Minh-Chau T. Pham
(74) Attorney, Agent, or Firm—Bruce P. Bardes (57) ABSTRACT A filter apparatus for deployment over a duct end in a forced air heating/ventilating/air conditioning system is described. The apparatus has been specifically designed for easy installation, and also for convenient cleaning and maintenance by occupants of the structure where the apparatus is employed. The apparatus preferably overhangs the duct end, thereby allowing improved filtration efficiency and reduced air pressure drop across the filter apparatus.

24 Claims, 5 Drawing Sheets

FILTER APPARATUS FOR HVAC SYSTEM

BACKGROUND OF THE INVENTION

1. Field of the Invention

This invention relates generally to forced air heating, ventilating and air conditioning systems and more particularly to a filter unit used at the end of a duct in such a system. The invention is particularly suited for use in an evaporative cooling system.

2. Description of Related Art

Virtually all modern buildings, whether residential, commercial or industrial, are equipped with systems for maintaining the air inside the building at a comfortable temperature and humidity, and reasonably free from airborne contaminants. A substantial art and industry supporting the design, fabrication and installation of such systems has grown up. This is often identified as the heating, ventilating and air conditioning (HVAC) art and industry, the term HVAC comprehends heating, cooling, filtering and related treating of air inside the building. Many such systems incorporate the forced movement of air within the structure through the HVAC apparatus; this type of system may be termed a forced air system.

The present invention is most closely related to the residential segment of the HVAC industry, though it will be recognized that HVAC apparatus for commercial and industrial structures comprise many of the same features as residential apparatus, differing primarily in size.

Those skilled in the HVAC arts recognize that there are many types of HVAC apparatus in widespread use today; they will also recognize that although the following discussion is couched in terms of representative types of apparatus, it is applicable to many other types of apparatus.

In temperate climates, which will be arbitrarily defined for this discussion as having frequent daily summertime temperatures in excess of 80° F. and frequent overnight wintertime low temperatures below 40° F., one very common type of HVAC system comprises a central heating/cooling apparatus, with a system of supply ducts for distributing the heated or cooled air throughout the structure and a system of return ducts for collecting air from various portions of the structure and returning said air to the heating/cooling apparatus. A filter is typically incorporated in such a system; it is typically situated in a return duct immediately adjacent to the heating/cooling apparatus. As the air inside the structure is recirculated through the living space in the structure and the HVAC apparatus, this HVAC system is termed a closed-loop system.

One purpose of filter elements in HVAC systems is to keep dust and dirt inside the structure down to a manageable level. Another purpose is to reduce the likelihood of injuries to the lungs of occupants of the building, where such injuries may result from breathing dirty air. However, the effectiveness of any filter apparatus depends on its design, and whether it is properly maintained. Maintenance typically means replacement of disposable filter elements or cleaning of reusable filer elements. If the heating/cooling apparatus is situated in a basement or utility room, maintaining or cleaning the filter element is relatively easy. However, if the heating/cooling apparatus is situated in a crawl space or attic, access to a filter is very difficult.

The type of filter element most commonly used in residential HVAC systems is comprised of a batt of glass fibers supported by expanded or perforated metal screens and a paper frame. Such filter elements are inexpensive, but also ineffective. Such filter elements typically remove less than ten percent of airborne particulate matter from the air passing through the filter element. Even where access to the filter element in an HVAC system is reasonably convenient, all but the most conscientious occupants of the structure are likely to maintain the filter less frequently than should be done. Where access to the filter is difficult, maintenance may be nonexistent.

Another type of HVAC system is frequently employed in hot dry climates, which will be arbitrarily defined for this discussion as having frequent daily summertime temperatures in excess of 95° F. and prevailing dew points below about 60° F. This is an evaporative cooler, also known as a swamp cooler. In such an apparatus, ambient air is drawn from the exterior of the structure across constantly moistened evaporator elements. Water on the evaporator elements vaporizes, absorbing the requisite heat of vaporization from the moving air stream. If the dew point of the ambient air is low enough, the air stream can absorb enough moisture to reduce its temperature to a comfortable indoor temperature. Because the effectiveness of an evaporative cooler depends upon the low dew point of the incoming air, these systems are operated as open-loop systems. Air is discharged from the interior of the structure to the outside air through exhaust ducts or open windows.

Because evaporative coolers operate as open-loop systems, all air entering the living space of the structure will contain whatever dirt and dust may be present in the ambient outdoor air. Typically, in a hot, dry climate, the air is very dusty and likely to contain dead vegetative matter. Also, any solids dissolved in the water used to moisten the evaporator elements will add to the airborne particulate matter as the water is evaporated. In addition, bacteria and mold may grow in the HVAC apparatus, creating another class of undesirable contaminants in the moving air stream. For structures of similar size, the volume of air passing through a swamp cooler is generally several times that passing through a closed-loop HVAC system. All of these factors point to a greater need for effective filtration in an open-loop HVAC system than in a closed-loop system. As evaporative coolers are frequently situated on the roof of a structure, rendering access to a filter located near the cooling unit impossible, filters are generally omitted from such HVAC apparatus.

In summary, filters in closed-loop HVAC systems are ineffective and filters in open-loop HVAC systems are nonexistent. Recognition of the need for more effective and more easily maintained filters for both closed-loop and open-loop HVAC systems led to the present invention. However, recognition of that need was only one factor in the present invention. Another factor was the realization that occupants of a structure can most easily maintain the filters in the HVAC system of that structure if the filter is situated within the living space thereof. Yet another factor was the discovery that those skilled in the HVAC arts had not heretofore adequately addressed that need.

The most relevant prior art known to the inventors comprises three patents issued to Hodge (U.S. Pat. Nos. 5,525,145, 5,690,719 and 5,989,303) and patents issued to Mack et al (U.S. Pat. No. 5,944,860) and Liedl (U.S. Pat. No. 5,176,570). The Hodge '145 and '719 patents and the Liedl patent are particularly relevant, for they identify a most preferred location for a filter in an HVAC system, namely, over a duct end at the point where that duct is joined to the living space within a room. The Hodge patents also provide an extensive survey of the HVAC arts existing as of the filing dates thereof, 1993 and 1995, respectively. Accordingly, disclosures of the Hodge '145 and '719 patents are incorporated herein by reference. Liedl's teachings differ from Hodge's to the extent that the only location he teaches for his filter apparatus is over a return air duct end.

The Hodge '303 and Mack et al patents disclose pleated or fanfold filter elements that are situated within the air distribution or collection ducts. While the latter two patents disclose filters installed near the duct end, those filters are actually installed within the duct, which creates considerable inconvenience in installing the filter apparatus and considerable difficulty in maintaining the filter elements. As for filtering effectiveness, a pleated filter element does have a larger filter surface area than a planar element, thereby reducing the restriction to the air passing theretrough, but at the expense of limiting the thickness of the filter element. While the thickness of the filter element, often in the form of a nonwoven fabric substance, is limited by the pleated configuration, the overall length of the filter assembly (measured in the direction of air flow) is necessarily increased by that configuration.

In his '145 and '719 patent, Hodge points out shortcomings in the prior art teachings of Anderson (U.S. Pat. No. 1,886,460), Wright (U.S. Pat. No. 1,694,089), Kung (U.S. Pat. No. 5,240,487), Tynan (U.S. Pat. No. 1,429,811) and Liedl. Both Anderson and Wright teach registers that must be removed for access to filters installed therebehind. Tynen teaches a register attachment that is integral with the register. Kung, like Hodge '303 and Mack et al, teaches installing filters in the duct behind the register or grill, as well as a scent dispenser. In short, none of these patents addresses the need for easy access to filter elements, to conveniently maintain those filter elements.

Although Hodge teaches easy access to the filter apparatus and easy removal from the duct end for maintenance in his '145 and '719 patents, his teachings are not without their own shortcomings. For example, in his '145 patent, he teaches securing the filter apparatus to an existing register or grille by using magnets attached to the frame of the filter apparatus; this necessarily implies that there must be a register, and it must be made of a ferromagnetic material. This teaching is inoperative with respect to aluminum and polymeric registers, both of which are widely used in the HVAC arts. He also teaches that the perimeter of the filter apparatus should correspond to the perimeter of the register, thereby ensuring that the cross sectional area of the filter element cannot be substantially larger than the opening in the register. This also implies that each filter apparatus be custom made, since overall dimensions of a given nominal register size vary considerably among the various manufacturers thereof. He teaches that airflow through the filter element must be maintained at a high velocity in order to achieve self-charging electrostatic behavior in the filter element. However, any filter element is essentially an obstruction in the HVAC system, and maintaining a high air velocity through a filter element will necessarily create a significant pressure drop in the stream of moving air. The pressure drop that is an inescapable consequence of Hodge's teaching places a significant load on the blower in the HVAC system, and necessitates careful sealing of all the ducts in the system to control air leakage therefrom. Furthermore, this excessive pressure drop is contrary to manufacturers' recommendations against high-density filters, which restrict air flow and possibly damage the HVAC equipment. This problem is particularly acute in heat pump HVAC systems. In this respect, the teaching and operation of his invention contradict the stated objects of his invention.

In his '145 patent, Hodge also teaches the desirability of washing the filter element and the frame at the same time. This necessarily limits the materials chosen for components of his filter apparatus to those that are not damaged by washing. The limitation is more severe if the filter apparatus is washed in a dishwasher, as Hodge suggests. Further, washing the entire filter apparatus may cause water to become entrapped in the channel that is an essential element of his teaching; such trapped water could leak onto the wall, or be blown into living space in the structure, if the filter apparatus in reinstalled before it is fully dry.

In his '719 patent, Hodge teaches attaching a support frame to the wall around the duct end. A filter apparatus is removably secured inside the support frame. As he teaches securing the support frame to the studs of the structure, it will necessarily be no longer than the distance between the studs. The filter frame may be smaller than the opening in a register that would be secured aver the duct end in the absence of a filter apparatus. The problem of pressure drop across the filter element is the same as in the filter apparatus described in the '145 patent, and perhaps worse.

The teaching of the Hodge '719 patent with respect to removing the filter elements and retaining grids for maintenance, and subsequently reinstalling them, may be inoperative. Hodge teaches that the filter elements and retaining grids must be carefully sized, and be sufficiently flexible to enable insertion into the channel of the filter frame. If these components are sufficiently flexible to be removed from the filter frame and reinstalled by hand, without factory assembly machinery, then they may well be so flexible as to be blown out of the channel in the filter frame by the stream of moving air, especially if the pressure drop across the filter is as great as is implied by the limited cross sectional area of the filter.

Liedl points out the desirability of placing a filter element in the living space of a structure, in order to facilitate filter maintenance. However, his apparatus is rather bulky and it requires a significant amount of disassembly to gain access to the filter. Further, his location of the filter apparatus, namely, over a return air duct end, renders it inoperative with respect to evaporative cooling systems. This is a serious limitation with respect to HVAC systems used in hot, dry climates.

OBJECTS OF THE PRESENT INVENTION

Development of the present invention began with the identification of the shortcomings of various types of prior art air filter apparatus, as discussed in the preceding section of this specification. Once these shortcomings were identified, it was possible to establish design criteria, or objects of the invention, that avoid them. Those objects are listed hereinbelow.

It is an object of the present invention to provide a filter apparatus for deployment over a duct end in a forced air HVAC system such that the apparatus may be conveniently and easily installed over either a supply duct or a return duct.

It is another object of the present invention to provide a filter apparatus that may be employed with either open-loop or closed-loop forced air HVAC systems.

It is another object of the present invention to provide a filter apparatus for deployment over a duct end in a forced air HVAC system such that it may be installed over an existing register at the duct end, or directly over the duct end without any associated register.

It is another object of the present invention to provide a filter apparatus for a forced air HVAC system such that the air passage through the apparatus is larger than the cross sectional area of the duct over which it is installed, thereby substantially reducing the static pressure drop across the filter apparatus and improving the filtration of airborne particulates.

It is still another object of the present invention to provide a filter apparatus such that a plurality of filter elements may be accommodated, and such that such filter elements may be conveniently and easily removed for maintenance without removing the filter apparatus from its position over the duct end in an HVAC system.

It is yet another object of the present invention to provide a filter apparatus for deployment over a duct end in a forced air HVAC system such that aesthetically pleasing designs may be incorporated therein.

Upon reading the following descriptions of the present invention and studying the accompanying drawings, these and other objects of the present invention will become apparent to one having ordinary skill in the HVAC arts. The following descriptions and drawings are presented with the intent of illustrating the concepts of the present invention, without limiting the scope of the present invention.

SUMMARY OF THE INVENTION

Briefly, the present invention provides a filter apparatus comprising a frame that is conveniently and easily disposed over a duct end in a forced air HVAC system, a filter element that is removably disposed within said frame, means to achieve easy access to said filter element for easy maintenance and/or replacement, and incidental related items to support the principal components identified herein. Unlike many forms of prior art filter apparatus, the filter apparatus of the present invention is not limited in size to the duct end over which it is installed, or a register to which it might be secured. In a preferred embodiment of the present invention, the filter elements are significantly larger in cross-sectional area than either the duct or the openings in an intervening register. Accordingly, the filter apparatus described herein thus provides significantly lower pressure drop across the filter element than prior art filter apparatus while improving filtration efficiency.

The filter apparatus of the present invention is provided with an opening in the side of the filter frame, over which a movable cover is fitted, so that the filter element may be easily removed for maintenance or replacement. Removal of the filter element is so simple that it may be performed by someone with little or no knowledge of the HVAC arts.

The filter element may be comprised of multiple layers of filter material, including, for example, a coarse-mesh screen, a glass fiber batt filter element and a polymer foam filter element, all disposed so that the air passing through the filter apparatus must pass sequentially through each layer of filter material.

The filter apparatus of the present invention has been developed with particular attention to flexibility in both application and installation. It may be employed with either open-loop or closed-loop HVAC systems. It may be employed over the end of an air supply duct, or an air return duct. It may be installed directly over a duct end, by securing it to the wall surrounding the duct end. It may be installed by securing it directly to an existing register, using hook bolts and thumb nuts. Although it is preferably larger in cross-sectional area than an existing register, it could be sized to match the overall dimensions of a register.

Specific features of the filter apparatus of the present invention are detailed in the following Detailed Description of the Invention and the accompanying drawings. The preferred modes of the present invention are also described therein. Those having ordinary skill in the HVAC arts will recognize alternative means of accomplishing the objects of the present invention, all of which are deemed to be equivalent to and to fall within the scope of the present invention.

DETAILED DESCRIPTION OF THE INVENTION AND PREFERRED EMBODIMENTS THEREOF

Figure 1:
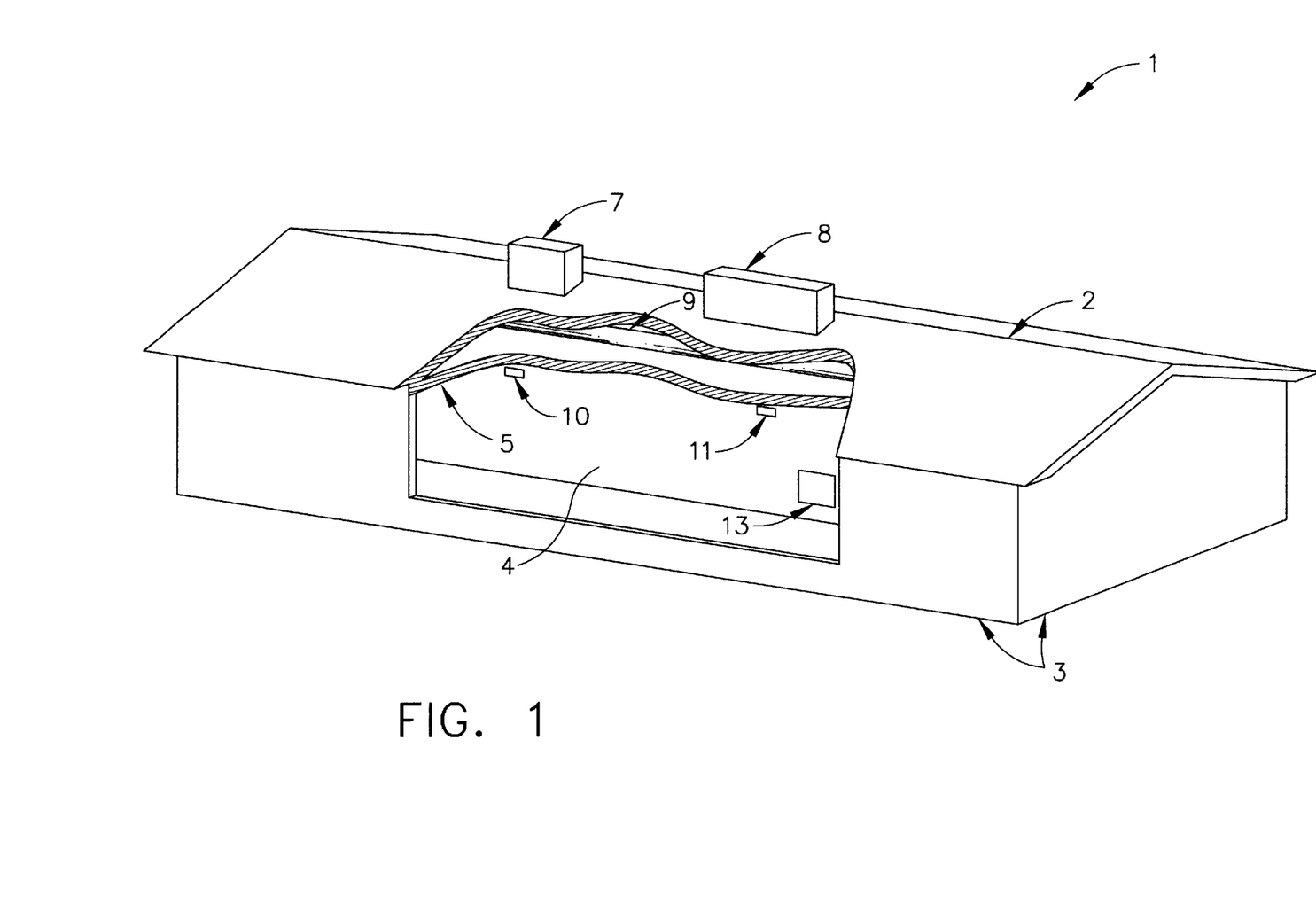
FIG. 1 is a schematic representation of a residential building, illustrating the installation of an evaporative cooler and a combination furnace and air conditioner, together with some of the ducts used in the building. The figure also illustrates the installation of filter apparatus of the present invention over both supply duct ends and return duct ends.

The filter apparatus of the present invention is advantageously described with reference to the Figures described hereinabove. The present invention is conveniently described in the context of one application therefor, namely, as part of an HVAC system employed in a residential structure in a hot, dry climate. Such a structure is shown schematically at 1 in FIG. 1. The principal elements of the structure are its roof 2, exterior walls 3, interior walls 4 and ceilings 5. FIG. 1 is not intended as a complete drawing of a house and the HVAC system employed therein, but rather as an illustration of principal features thereof. The principal elements of the HVAC system are an evaporative cooler 7, a combination heater-cooler 8, a main distribution duct 9, supply registers 10 and 11, and a return register 13. Note that the evaporative cooler 7 and the heater-cooler 8 are commonly situated on the roof of the structure. Each is connected to the main distribution duct 9 via a connecting duct, which is not shown in FIG. 1. The connecting duct from the evaporative cooler 7 is commonly fitted with a gravity-operated or spring-biased damper (not shown in FIG. 1), which prevents the backward flow of air from the main distribution duct 9 to the outside atmosphere through the evaporative cooler 7 when the apparatus is operated in closed-loop mode.

Secondary ducts, generally contained within interior walls 4, but not shown in FIG. 1, carry air from the main distribution duct 9 to supply registers 10 and 11. In a hot, dry climate, HVAC systems are designed first to meet cooling needs of the structure, and secondary consideration is given to heating needs. In such a case, the registers 10 and 11 would generally be situated high on interior walls 4 of the structure. When using an evaporative cooler, one must provide for exhausting air from the interior of the structure to the outside of the building. This may be achieved by open windows, or by exhaust ducts through the ceiling 5 into the attic (not shown in FIG. 1). As indicated above, an HVAC system operated in this mode is an open-loop system. During open-loop operation of such an HVAC system, airborne particulate matter drawn from the outside air is likely to be deposited in the ductwork, where that particulate matter becomes a source of contamination during closed-loop operation.

For heating the structure of FIG. 1 another device 8 is employed. The generic term heater-cooler is used herein for said device. The heating function may be provided by a fuel-fired furnace, a compressor/condenser heat pump, or electric resistance coils. To provide cooling, the compressor/condenser heat pump, or a separate air conditioning unit used in conjunction with the heater, may be used, particularly if the dew point of ambient air is above about 60° F. Air leaving the heater-cooler 8 is directed into the main distribution duct 9 through a connecting duct (not shown in FIG. 1). As the types of heater-coolers described above are preferably operated as closed-loop systems, air is returned from the interior of the structure to the heater-cooler 8 through a return duct, typically enclosed within an interior wall 4 of the structure. A register over such a duct is shown in FIG. 1 at 13. Filter apparatus of the present invention may be installed over supply registers 10 and 11, or over return register 13, or directly over the underlying duct ends without employing registers. It must be noted that houses are generally provided with at least one supply duct in each room, and even moderate size houses may be provided with multiple HVAC systems, operating in different zones of the house.

In temperate climates, the need for heating during the winter typically dominates the design of the HVAC system. In such systems, the supply duct ends are typically located in the floors, or low on the exterior walls. Also, return duct ends are typically located high on interior walls. As there are few heavily populated regions in temperate climate regions of the United States where the prevailing summertime dew points are low enough to enable use of evaporative cooling, these HVAC systems typically rely on compressor/condenser technology for cooling. One having ordinary skill in the HVAC arts will recognize that these and other modifications to the HVAC system shown in FIG. 1 will be needed for installation in a temperate climate.

Note that in several of the Figures, and in the text of the present specification, the filter apparatus is shown or described using directional terminology representative of one common application of the filter apparatus. In general, such directional terms reflect the viewpoint of a person standing in a room, facing the filter apparatus. Specifically, the filter apparatus is described as being disposed over a duct end, where the term "duct end" comprehends not only the end of a duct carrying heating and ventilating air to or from a furnace or air conditioning device into the room, but also any opening cut through a vertical wall of a room to admit air from the duct into the room. In the context of the present invention, terms such as "down", "lower" or "bottom" indicate the direction toward the floor of the room. Similarly, "back" identifies the portion of the filter apparatus nearest the wall of the room and "front" identifies the portion of the filter apparatus farthest from the wall of the room. The use of such terms is regarded as illustrative, rather than limiting, for the apparatus may be readily utilized in other orientations and positions.

Figure 2:
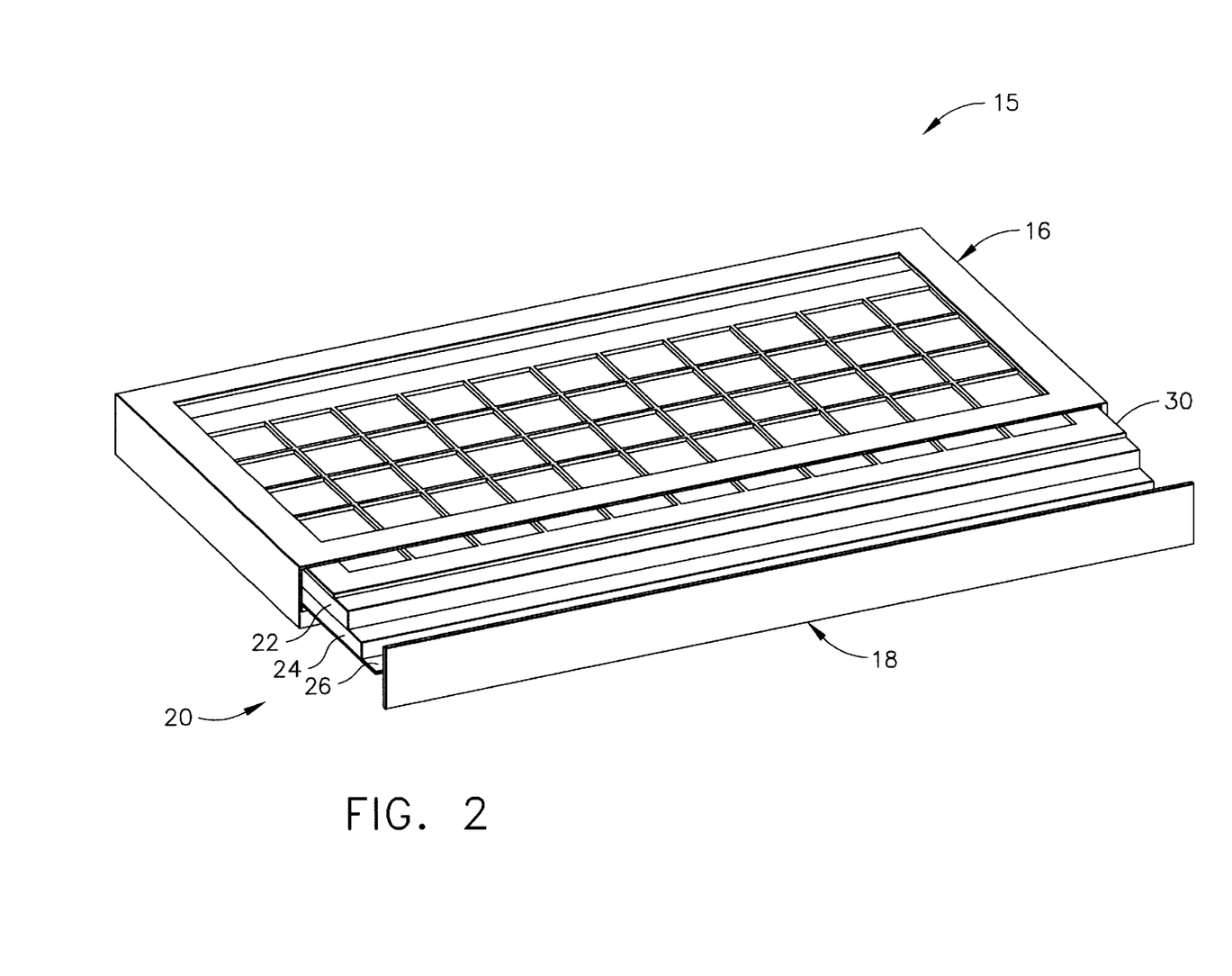
FIG. 2 illustrates the use of a multilayer filter element in the filter apparatus of the present invention.

The overall arrangement of the filter apparatus 15 is shown pictorially in FIG. 2. In the particular embodiment of the invention shown in FIG. 2, filter element 20 comprises three filter layers, 22, 24 and 26. However, the inventors of the present invention regard filter elements comprised of a single layer, or two layers, or more than three layers, as lying within the scope of their invention. In the present configuration, the rearmost filter layer 26 is fabricated from coarse-mesh woven wire screening, and fulfills the two functions of a filter layer and a means for securing the filter element within the frame, shown in FIG. 2 at 16. A screen 30 is disposed at the front of the filter element to secure it within the frame 16. For simplicity, the screen is shown as a rectangular grid; it could be cut from woven wire screening, or perforated metal having round holes or holes of any other desired decorative shape, or a molded part specifically designed for this function. To emphasize that the filter layers may be separable from each other, they are shown slightly offset from each other in FIG. 2. When the apparatus is fully deployed for use, all layers of the filter element 20, and the means for securing the filter element within the frame 26 and 30 will lie completely within the frame 16, and the bottom of the frame will be covered by bottom cover 18.

Many of the filter materials known in the HVAC arts may be advantageously employed in the filter element 20 of the present invention. Some of those filter materials deemed particularly appropriate to the present invention are: microfiber filter materials; open-pore polymer foams; pleated paper filters; cloth filters stretched over a supporting frame; and high performance filters, often identified by the acronym HEPA filters. In the context of the present invention, filters made from materials that may be washed without damage thereto are particularly preferred. One skilled in the HVAC arts will recognize that the present invention is directed toward using known filter materials in a manner that achieves effective filtration of the moving air stream and simultaneously renders cleaning or replacement of the filter element so simple and convenient that occupants of the building can readily accomplish those tasks.

Figure 3:
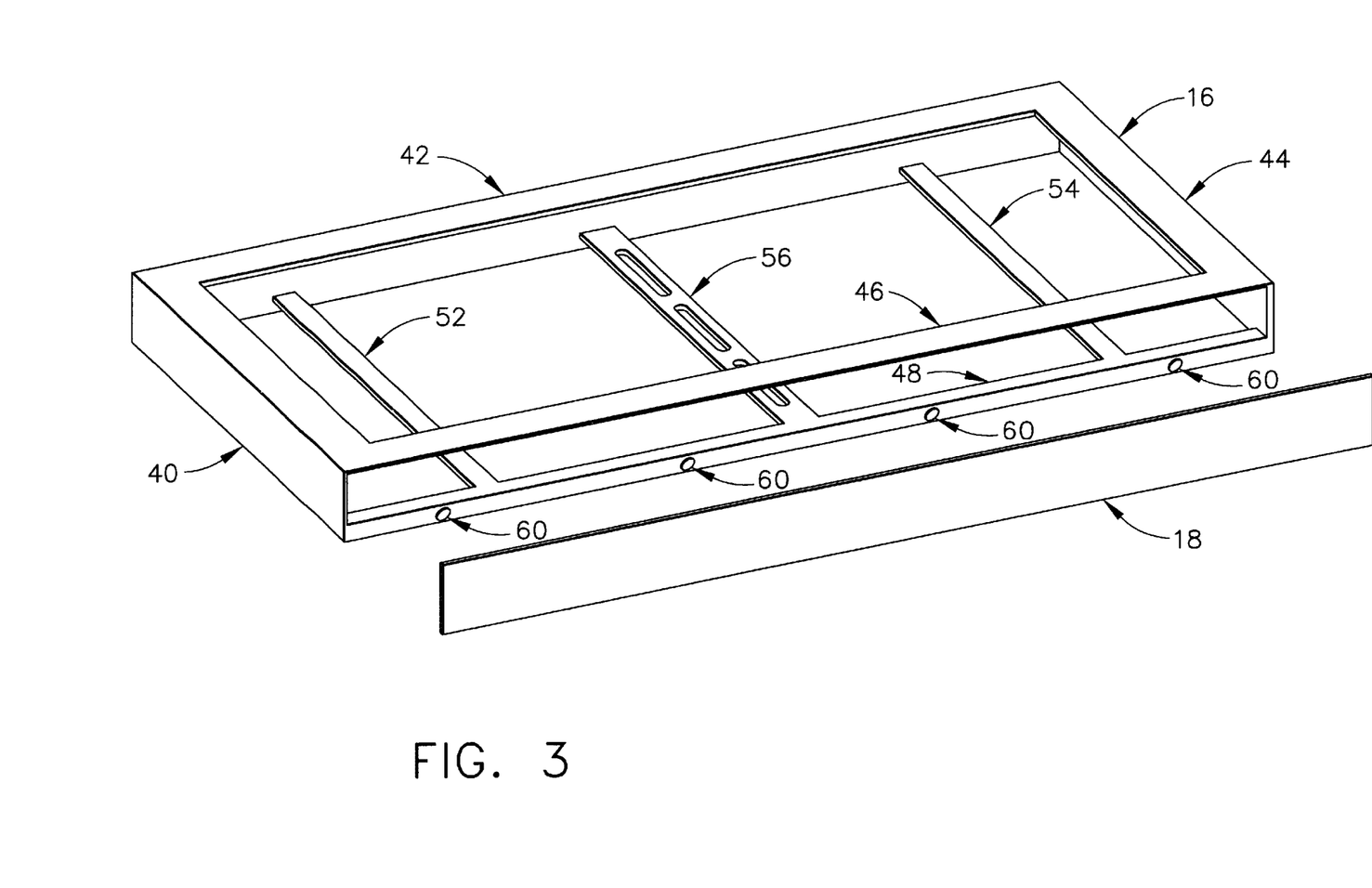
FIG. 3 illustrates the construction of the filter apparatus of the present invention, omitting the filter elements to better show the internal construction thereof.

The construction of the frame 16 is depicted in FIG. 3. The fame is comprised of five principal members: left side wall member 40, top wall member 42, right side wall member 44, bottom face member 46 and internal brace 48. The three wall members 40, 42 and 44 are angular in cross section, thereby facilitating both installation and removing and/or replacing filter elements. For aesthetic reasons, the bottom face member 46 is preferably a flat strip having generally similar dimensions to the front flange of the three wall members. The internal brace 48 may be any convenient cross section, including angular (as shown in FIG. 3), rectangular, or a rectangular tube. Support bars 52 and 54 are preferably flat strips; they comprise part of the means for securing the filter element within the frame. Attachment member 56 is also preferably a flat strip, with slats cut therethrough; it comprises part of the means for securing the frame over a duct end. For large-size filter apparatus, members 52, 54 and 56 may be advantageously fabricated from channel-section material.

The rear portion of frame 16 comprises a plenum. The plenum is defined by the rear edges and interior surfaces of the left side wall member 40, top wall member 42, right side wall member 44, and internal brace 48, and by the rear surface of filter element 20. The wall to which the apparatus is affixed serves to close the rear of the plenum.

Many combinations of material and fabrication methods for constructing the frame have been contemplated during development of the present invention. For example, the three wall members could be extruded from a suitable polymeric material, such as polyvinyl chloride (PVC). It is easy to miter the corners from separate pieces of the extrusion, then bond the adjacent pieces together with an adhesive substance. In one particularly favored embodiment of the invention he adhesive substance contains a solvent that partially dissolves the PVC extrusion, and then hardens as the solvent therein evaporates. This technology is widely used in joining PVC pipes. Alternatively, the three wall members could be fabricated from a single section of extruded angle material by notching the front flange at appropriate locations, then bending the side flange at the two notches. The remaining components of the frame could also be cut from PVC extrusions, and bonded in place with an adhesive substance. The front face of the frame, defined by the front flanges of the three wall members and the bottom face member, are in full view of anyone in a room where the filter apparatus is employed. Similarly, inner edges of the front flanges of the three wall members and an inner edge of the bottom face member define an air passage through the filter apparatus.

One alternative type of construction would be to use aluminum alloy extrusions in place of the PVC extrusions described above. Joining the various pieces could be accomplished by welding, adhesive bonding, riveting, or any other convenient method.

A second alternative type of construction would be piercing, notching and bending a piece of sheet metal to achieve the shape shown in FIG. 3. In this embodiment of the invention, the three wall members and the bottom face member would be formed from a single sheet of metal, preferably either steel or aluminum. Bending tabs formed on the left, right and top edges would create a structure functionally equivalent to the side flanges described above. The air passage would be punched out of the central section of the metal sheet. The remaining components of the frame could also be fabricated from sheet metal, and joined to the principal component described above by any convenient joining method.

The frame could also be designed and fabricated as a single molded component of polymeric material, if desired. Such a design would be simple and easy to install, but at the cost of reduced flexibility in producing frames of odd sizes to meet specific installation requirements.

Regardless of the construction technology employed in making the frame, reinforcing plates or brackets inside the corner joints of the frame could be employed, depending on the size of the apparatus, the thickness of the wall members, and the type of joint employed.

It will be apparent to one skilled in the manufacturing arts that a frame structure having the functional attributes described herein can be fabricated in many ways from a wide variety of materials without departing from the spirit and intent of the present invention.

Some sort of ornamental treatment, to enhance the appearance of the filter apparatus, could be appropriate, even though one skilled in the HVAC arts would recognize that it is not functionally necessary. Such ornamental treatment could include sculpturing the visible surfaces of the apparatus, sculpturing the visible surface of the filter element and/or the means for securing the filter element within the frame, or simply painting the apparatus.

The bottom cover 18 may be secured over the opening in the lower portion of the frame by any convenient method. In FIG. 3, a plurality of permanent magnets 60 are shown affixed to the internal brace 48. These magnets secure the bottom cover by magnetic force exerted on the bottom cover (if it is fabricated from a ferromagnetic material), or on ferromagnetic material attached to the inner side of the bottom cover 18. This is considered the preferred embodiment of the present invention. The bottom cover 18 may also be secured to the internal brace 48 by attaching mating strips of hook-and-loop material to these two components. Such hook-and-loop material is often called Velcro, which is the trade name for one such product. Other means for movably securing the bottom cover 18 to the frame 16 are deemed to fall within the scope of the present invention.

If desired, the bottom cover 18 may be hinged to the frame 16. The hinge(s) could be attached to the bottom face member 46 and the bottom cover 18; alternatively, the hinge(s) could be attached to the internal brace 48 and bottom cover 18. Either a plurality of small hinges, or a single long hinge, termed a piano hinge, would suffice. In either case, some supplementary means for securing, such as the magnets described above, would be needed.

Regardless of the means selected for movably securing the bottom cover 18 to the frame 16, the essential functionality is that the cover may be readily moved to allow the filter element 20 to be removed from the frame 16. Once removed from the frame, the filter element may be washed or replaced, as desired. Particularly when the filter apparatus of the present invention is used in conjunction with an evaporative cooler, frequent cleaning or replacement of the filter element is necessary to maintain the HVAC equipment in proper working order. In many prior art types of filter apparatus, removal of the filter element from the frame is difficult, generally requiring removal of the entire apparatus from its service position over the duct end. Where the frame is comprised of channel-shaped members, there is the additional difficulty in removing the filter element from within the frame, as the edges of the filter element must be extracted from the channel openings in the frame.

As indicated above, most types of air filter apparatus known before the present invention suffer from the shortcoming that the air passage through such devices is typically no larger than the air duct supplying air to the filter apparatus. Two consequences of this shortcoming are the back pressure in the duct system and the load placed on the fan motor. Either can lead to premature failure of the HVAC system and/or clogging of the filter element. To alleviate these problems, the filter apparatus of the present invention is preferably larger than the duct end. For example, the air passage in the present filter apparatus is most preferably at least twice as large as the cross sectional area of the duct end over which it is secured. The large area of the filter element substantially reduces back pressure in the HVAC system and clogging of the filter element. The plenum is an important feature of the present invention. It serves to distribute air from a supply duct to the entire rear surface of the filter element; conversely, when the filter apparatus is employed over a return duct, it serves to collect air from the entire rear surface of the filter element and direct the air to the duct end. Without such a plenum, the advantages achieved by having a filter apparatus larger than the duct end would be lost.

Figure 4:
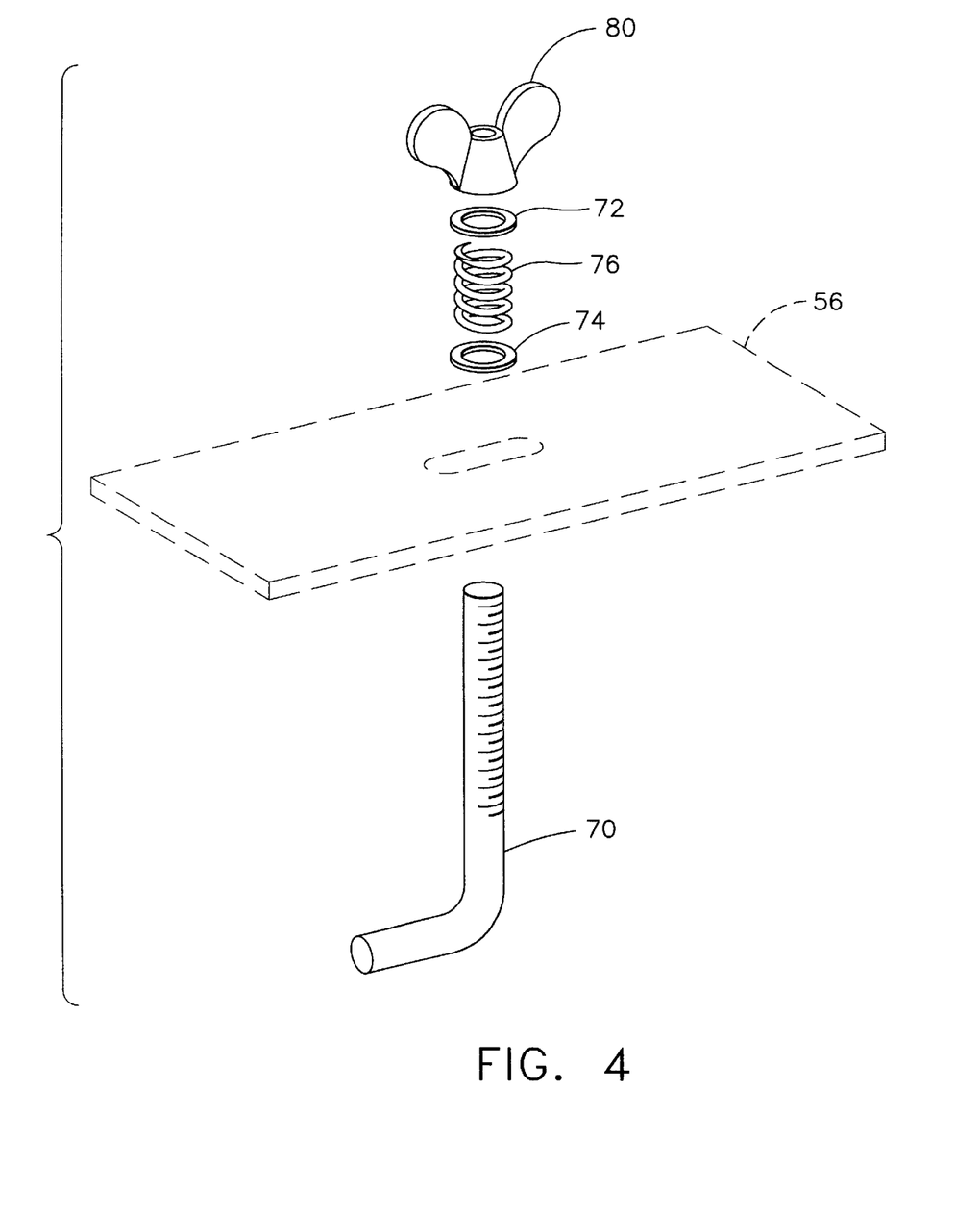
FIG. 4 illustrates the use of hook bolts and thumb nuts to secure the filter apparats to an existing register.

Various features of the present invention, as well as means for securing it over the duct end, as described herein, have been developed with the specific intent of accommodating a filter apparatus that is significantly larger than the duct end. The rear of the filter apparatus is preferably planar, to lie directly against the wall surrounding a duct opening. There is no need to have the filter apparatus fitted to a register installed over the duct end. Though a register offers a convenient means for securing the filter apparatus over the duct end, it offers no other advantages when employing the present invention. Because the filter element is easily removed from the frame of the present apparatus, the frame may be secured over the duct end without the inconvenience of working around the filter element. Means for securing the filter apparatus in place may be as simple as screws and cooperating dry wall anchors, where the screws utilize the slots in attachment member 56. Alternatively, wood screws passing through holes in support members 52 and 54 (holes are not shown in the Figures) may be used to secure the filter apparatus to studs incorporated in the wall structure. To facilitate this method of installation, the spacing of the support members 52 and 54 would preferably be 16 inches center-to-center, corresponding to conventional stud spacing in building construction.

Where a register over a duct end already exists, the filter apparatus of the present invention is conveniently secured to that register by using hook bolts, as shown in FIG. 4. In this system, a hook bolt 70, having washers 72 and 74 and compression spring 76 disposed on its shank portion, is inserted through a slot in attachment member 56 and any convenient opening in the register (not shown), turned about 90° to engage the hook on the bolt with the register, and then nut 80 may be tightened to secure the frame to the register. The use of the spring and washer arrangement facilitates the installation of the hook bolt with one hand, while the frame is held in position with the other hand. The configuration of the hook bolt 70 in FIG. 4 is an L-hook. Many other configurations, such as J-hooks or T-hooks, are functionally equivalent. Similarly, nut 80 is shown as a wing nut. Although any form of nut is functionally equivalent, the wing nut is particularly amenable to easy adjustment to facilitate one-hand installation. Many other means for securing the filter apparatus over an existing register would be effective. Something as simple as a piece of wire looped around a portion of the filter apparatus and a portion of the register, then twist to tighten the loop, would probably suffice. Spring clips and/or magnetic devices could also be employed.

Performance of the filter apparatus is enhanced when an air seal between the duct end and the air passage through the filter apparatus can be effected by suitable gasket means. Leakage air that does not pass through the filter element cannot be filtered, thus limiting the effectiveness of the filter. One preferred means for sealing comprises sealing the duct to the wall, preferably with an adhesive tape of the type known as duct tape, and then sealing the filter apparatus to the wall. To this end, the rear surface of the frame 16 is preferably fitted with compliant gasket material. One embodiment of this concept is a "boot" having U-shaped cross section that fits over the rear edges of the three wall members 40, 42 and 44 and the internal brace 48. The technology employed in automotive door seals is appropriate for this application. A simpler, though possibly less effective, embodiment comprises adhesively bonded polymeric foam tape, such as that widely used around doors and windows as weather stripping, secured to, or just inside, the rear surface of the frame. For the same reasons, it is appropriate to install gasket means around the periphery of the bottom cover 18. For esthetic reasons, this gasket means is preferably attached to the bottom portion of the frame 16, where it is hidden from view, but in contact with the bottom cover 18.

Figure 5:
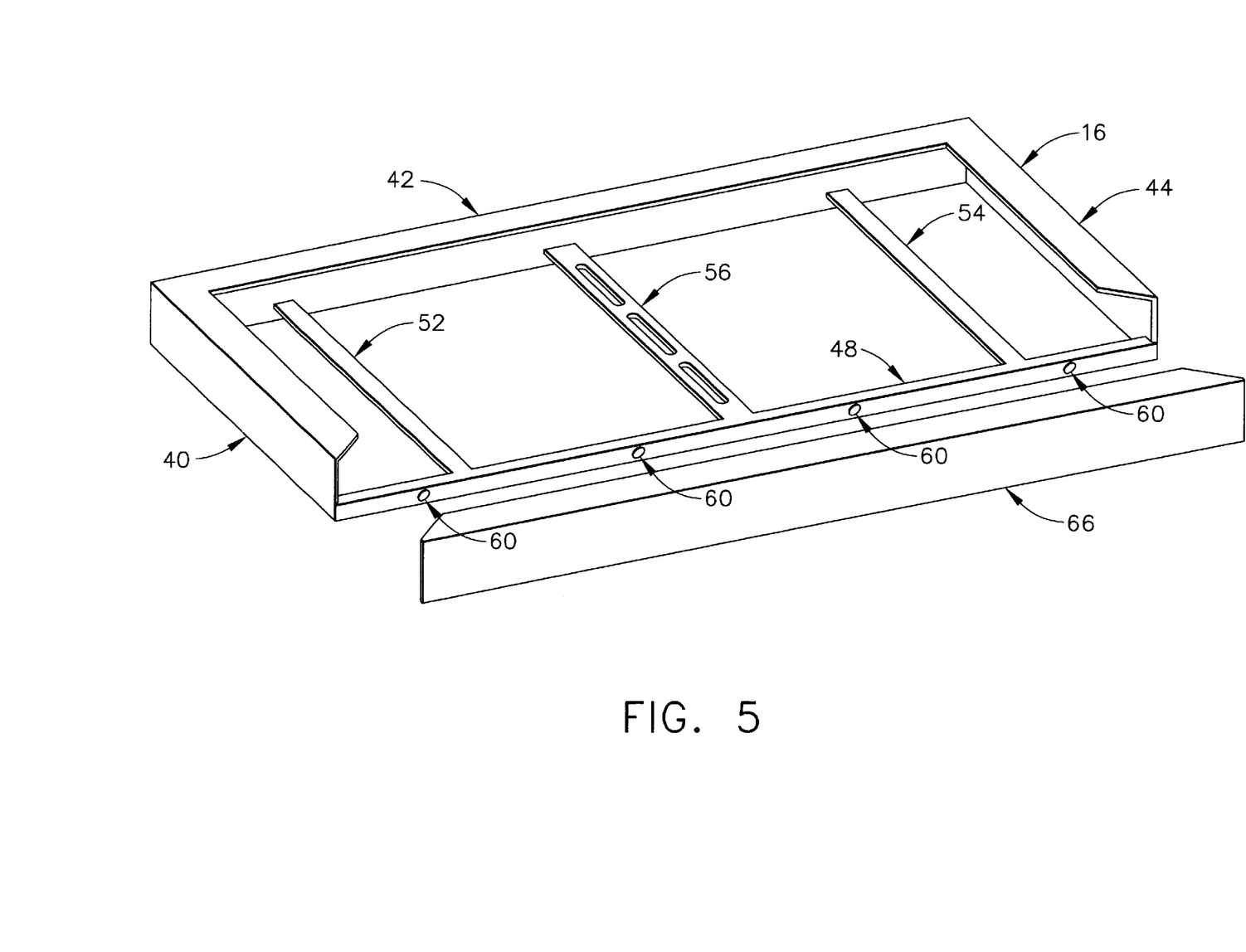
FIG. 5 illustrates an alternative embodiment of the frame and bottom cover of the filter apparatus.

Another embodiment of the present invention is shown in FIG. 5. In this embodiment, the bottom face member and the bottom cover, shown at 46 and 18, respectively, in FIG. 3, are combined into a single angular bottom cover 66. The left and right side wall members 40 and 44, respectively, are preferably mitered to achieve a visually pleasing appearance of the apparatus. Otherwise, the frame shown in FIG. 5 is substantially similar to that shown in FIG. 3.

The filter apparatus of the present invention is contemplated as applicable to any situation where an air duct connects to a room. Any duct end, whether a supply duct end or a return duct end, may be advantageously fitted with the present filter apparatus. Also, the preset filter apparatus is appropriate for both heating and cooling applications. However, the presently contemplated best mode of the invention is as part of an evaporative cooling system, or swamp cooler. One significant problem in operating swamp coolers is that outside air is forced over an evaporator element, then blown directly into the living space inside the building being cooled. Accordingly, any dust and dirt, sprigs of plants, molds, and the like, from the outside air are blown into the living space. Typically, there is no convenient location for a filter in such a system. The occupants of the building cannot easily maintain filters, unless those filters are within the living space. Prior art filters generally do not have adequate capacity to effectively handle the volume of air utilized in a swamp cooler. Therefore, filters are often omitted is such systems.

The best mode embodiment of the present filter apparatus provides an air passage that is at least twice the size of the duct end in the forced air system. Preferably, the air passage is five or more times the size of the duct end. The frame of the best-mode apparatus is extruded from polyvinyl chloride angles and flat strips, with mitered and adhesively bonded corners; reinforcing the corners with angle plates is preferred. The dimensions of the side flanges of the extruded angles utilized as wall members must be sufficiently large to accommodate the filter element, plus provide ample space for air flow from the duct end to the rear surface of the filter element. The dimensions of the front flanges of the extruded angles may be as small as desired, consistent with the need to secure the filter element within the frame, and to provide a reasonably rigid frame. The best-mode filter element comprises a coarse-mesh wire screen (which also serves to secure the filter element within the frame), a loose fiber filter layer and an open-cell foam filter layer. These filter elements are preferably made of washable materials, to facilitate maintenance. The front of the filter is secured within the frame by a grid-like member that may incorporate esthetically pleasing features visible through the air passage of the apparatus. The bottom cover is made from PVC strip and provided with a strip of steel affixed thereto. The steel strip and magnets affixed to the internal brace secure the bottom cover against the frame. The best mode for securing the filter apparatus over the duct end is one or more hook bolts securing the attachment member to an existing duct register. The best mode filter apparatus also includes gasket means, such as adhesive-backed foam tape, around the rear edge of the frame and the periphery of the bottom cover.

While the preferred embodiment and best mode of the present invention have been described herein in order to illustrate the principles and applications thereof, it is understood that various modifications or alterations may be made to the present invention without departing from the true scope of the invention set forth in the appended claims.

We claim:

1. A filter apparatus for deployment over a duct end in a forced air HVAC system, said filter apparatus comprising:
   a filter element;
   a frame;
   means for removably securing said filter element within said frame;
   a plenum within said frame;
   a bottom cover;
   means for movably securing said bottom cover to said frame; and
   means for securing said filter apparatus over said duct end;

wherein:
said frame comprises:
left side, top and right side wall members, each wall member being generally angular in cross section and having a front flange and a side flange;
a bottom face member; and
an internal brace;
said front flanges of said left side, top and right side wall members and said bottom face member are joined together, thereby defining a front face of said frame and an air passage through said apparatus;
said side flanges of said left side, top and right side wall members and said internal brace are joined together, a left end of said internal brace being joined to a bottom end of said left side wall member and a right end of said internal brace being joined to a bottom end of said right side wall member, thereby defining a wall structure of said frame;
said plenum is defined by rear edges and interior surfaces of said wall structure, extending forward to a rear surface of said filter element; and
said filter element is sufficiently large to cover said air passage through said apparatus.

2. The filter apparatus as recited in claim 1, wherein said filter element comprises a plurality of filter layers, disposed such that air passing through said filter element passes through each filter layer.

3. The filter apparatus as recited in claim 1, wherein said filter element comprises a high performance filter layer.

4. The filter apparatus as recited in claim 1, wherein said filter element comprises a front surface having a sculptured design thereupon, said front surface being disposed proximately to said front face of said frame.

5. The filter apparatus as recited in claim 1, wherein a cross sectional area of said air passage is larger than a cross sectional area of said duct end.

6. The filter apparatus as recited in claim 5, wherein said cross sectional area of said air passage is at least twice as great as said cross sectional area of said duct end.

7. The filter apparatus as recited in claim 1, wherein said left side, top and right side wall members are made from an extruded material.

8. The filter apparatus as recited in claim 1, wherein said means for securing said filter element within said frame comprises a screen interposed between said filter element and said front face of said frame.

9. The filter apparatus as recited in claim 1, wherein said means for securing said filter element within said frame comprises a plurality of support bars, each disposed between and secured to said side flange of said top wall member and said internal brace.

10. The filter apparatus as recited in claim 9, wherein said means for securing said filter element within said frame additionally comprises a screen interposed between said filter element and said support bars.

11. The filter apparatus as recited in claim 1, wherein said means for movably securing said bottom cover to said frame comprises separable attachment means attached to said movable bottom cover and said internal brace.

12. The filter apparatus as recited in claim 11, wherein said separable attachment means comprises a magnet and a ferromagnetic object.

13. The filter apparatus as recited in claim 11, wherein said separable attachment means comprises strips of hook-and-loop material.

14. The filter apparatus as recited in claim 1, wherein said means for movably securing said bottom cover to said frame comprises hinge means pivotably securing said bottom cover to said bottom face member.

15. The filter apparatus as recited in claim 1, wherein said means for movably securing said bottom cover to said frame comprises hinge means pivotably securing said bottom cover to said internal brace.

16. The filter apparatus as recited in claim 1, wherein said means for securing said filter apparatus to said duct end comprises an attachment member disposed between and secured to said side flange of said top wall member and said internal brace.

17. The filter apparatus as recited in claim 16, wherein said attachment member is provided with at least one opening therethrough, said opening being sized and disposed to accommodate means for securing said attachment member over said duct end.

18. A filter apparatus as recited in claim 1, additionally comprising a register secured over said duct end and
wherein said filter apparatus is secured over said register.

19. The filter apparatus as recited in claim 1, additionally comprising a register secured over said duct end and
wherein said filter apparatus is secured to said register.

20. The filter apparatus as recited in claim 19, wherein said means for securing said filter apparatus to said register comprises an attachment member disposed between and secured to said side flange of said top wall member and said internal brace, said attachment member being provided with at least one opening therethrough, said opening being sized and disposed to accommodate screw means for securing said attachment member to said register, wherein said screw means comprises a hook bolt and nut.

21. The filter apparatus as recited in claim 20, wherein said screw means additionally comprises compression spring means disposed around said hook bolt.

22. The filter apparatus as recited in claim 1, wherein said side flange of each side wall member and said bottom cover are provided with compliant gasket means to impede air leakage from said filter apparatus.

23. A filter apparatus for deployment over a duct end in a forced air evaporative cooling system, said filter apparatus comprising:
a filter element;
a frame;
means for removably securing said filter element within said frame;
a plenum within said frame;
a bottom cover;
means for movably securing said bottom cover to said frame; and
means for securing said filter apparatus over said duct end;
wherein:
said frame comprises:
left side, top and right side wall members, each wall member being generally angular in cross section and having a front flange and a side flange;
a bottom face member; and
an internal brace;
said front flanges of said left side, top and right side wall members and said bottom face member are joined together, thereby defining a front face of said frame and an air passage through said apparatus;
a cross section area of said air passage is at least twice a cross sectional area of said duct end;
said side flanges of said left side, top and right side wall members and said internal brace are joined together, a left end of said internal brace being joined to a bottom end of said left side wall member and a right end of said internal brace being joined to a bottom end of said right side wall member, thereby defining a wall structure of said frame;

said plenum is defined by rear edges and interior surfaces of said wall structure, extending forward to a rear surface of said filter element;

said filter element is sufficiently large to cover said air passage through said apparatus; and said wall structure of said frame and said bottom cover are each provided with compliant gasket means to impair air leakage from said filter apparatus.

24. A filter apparatus for deployment over a duct end in a forced air HVAC system, said filter apparatus comprising:

a filter element;

a frame;

means for removably securing said filter element within said frame;

a plenum within said frame;

a bottom cover being generally angular in cross section;

means for movably securing said bottom cover to said frame; and means for securing said filter apparatus over said duct end;

wherein:

said frame comprises:
left side, top and right side wall members, each wall member being generally angular in cross section and having a front flange and a side flange; and
an internal brace;

said front flanges of said left side, top and right side wall are joined together, thereby defining a front face of said frame and, in conjunction with said bottom cover, defining an air passage through said apparatus;

said side flanges of said left side, top and right side wall members and said internal brace are joined together, a left end of said internal brace being joined to a bottom end of said left side wall member and a right end of said internal brace being joined to a bottom end of said right side wall member, thereby defining a wall structure of said frame;

said plenum is defined by rear edges and interior surfaces of said wall structure, extending forward to a rear surface of said filter element; and said filter element is sufficiently large to cover said air passage through said apparatus.

\* \* \* \* \*